(12) United States Patent
Cohen et al.

(10) Patent No.: US 8,798,693 B2
(45) Date of Patent: Aug. 5, 2014

(54) EARPIECE WITH VOICE MENU

(75) Inventors: Ephram Cohen, San Francisco, CA (US); Nicholas R. Michael, San Francisco, CA (US); Caslav V. Pavlovic, Palo Alto, CA (US); Michael R. Jones, Naperville, IL (US)

(73) Assignee: Sound ID, Palo Alto, CA (US)

( * ) Notice: Subject to any disclaimer, the term of this patent is extended or adjusted under 35 U.S.C. 154(b) by 654 days.

(21) Appl. No.: 12/716,209

(22) Filed: Mar. 2, 2010

(65) Prior Publication Data

US 2011/0217967 A1 Sep. 8, 2011

(51) Int. Cl.
*H04M 1/00* (2006.01)
*H04R 25/00* (2006.01)

(52) U.S. Cl.
USPC .................. 455/575.2; 381/370; 381/376

(58) Field of Classification Search
CPC ....................................... H04R 5/033
USPC ......... 455/418, 419, 41.1, 41.2, 569.1, 569.2, 455/575.2
See application file for complete search history.

(56) References Cited

U.S. PATENT DOCUMENTS

| | | | |
|---|---|---|---|
| 5,721,783 A | 2/1998 | Anderson | |
| 6,122,500 A | 9/2000 | Dent et al. | |
| 6,230,029 B1 | 5/2001 | Hahn et al. | |
| 6,487,277 B2 | 11/2002 | Beyda et al. | |
| 6,560,468 B1 | 5/2003 | Boesen | |
| 6,684,063 B2 | 1/2004 | Berger et al. | |
| 6,694,143 B1 | 2/2004 | Beamish et al. | |
| 6,944,474 B2 | 9/2005 | Rader et al. | |
| 7,333,933 B2 | 2/2008 | Brennan et al. | |
| 7,490,286 B2 | 2/2009 | Commarford et al. | |
| 7,494,216 B2 | 2/2009 | Jannard et al. | |
| 2001/0014146 A1* | 8/2001 | Beyda et al. | 379/88.25 |
| 2001/0030611 A1* | 10/2001 | O'Rourke | 340/825.25 |
| 2002/0071581 A1 | 6/2002 | Leysieffer et al. | |
| 2002/0197961 A1 | 12/2002 | Warren | |
| 2003/0045283 A1 | 3/2003 | Hagedoorn | |

(Continued)

FOREIGN PATENT DOCUMENTS

DE 10200796 A1 7/2003
DE 10222408 A1 11/2003

(Continued)

OTHER PUBLICATIONS

Q1 User Guide. Manual [online]. BlueAnt Wireless. 2009 [retrieved on Apr. 12, 2011]. Retrieved from the internet: <URL: http://docs.blueantwireless.com/pdf/Q1UserGuide(en).pdf>, 43 pages.
Search Report from family member PCT Application No. PCT/US2011/026703, mailed Apr. 29, 2011, 20 pages.
Bluetooth Specification, Serial Port Profile, Version 1.1., Part K:5, Feb. 22, 2001, 27 pages.
Kansal, Aman, "Bluetooth Primer" Internet Citation http://www.holtmann.org/lecture/bluetooth/bt_primer.pdf, retried on Aug. 20, 2004, 30 pages.
Supplementary European Search Report from EP family member application mailed May 7, 2009, 10 pages.

*Primary Examiner* — Huy C Ho
(74) *Attorney, Agent, or Firm* — Haynes Beffel & Wolfeld LLP (57) ABSTRACT

An ear-level device which can be operable in multiple modes supports a voice menu by which more complex functions executable by the ear-level device or by a companion module can be selected using input at the ear-level device. By pushing a button on an earpiece for example, a voice menu is activated announcing a set of functions such as voice dial, last number redial and so on. When the function that the user wants is announced, the user presses the same button which activates the execution of the function.

22 Claims, 7 Drawing Sheets

(56) References Cited

U.S. PATENT DOCUMENTS

| | | |
|---|---|---|
| 2004/0136555 A1 | 7/2004 | Enzmann |
| 2004/0157649 A1 | 8/2004 | Jannard et al. |
| 2004/0192349 A1 | 9/2004 | Reilly |
| 2005/0064915 A1 | 3/2005 | Lair |
| 2005/0069161 A1 | 3/2005 | Kaltenbach et al. |
| 2005/0078844 A1 | 4/2005 | Von Ilberg |
| 2005/0081152 A1* | 4/2005 | Commarford et al. ........ 715/705 |
| 2005/0090295 A1 | 4/2005 | Ali et al. |
| 2005/0096096 A1 | 5/2005 | Birli et al. |
| 2005/0100185 A1 | 5/2005 | Connors et al. |
| 2005/0124391 A1 | 6/2005 | Lee et al. |
| 2005/0255843 A1 | 11/2005 | Hilpisch et al. |
| 2005/0288057 A1 | 12/2005 | Lai et al. |
| 2006/0025074 A1 | 2/2006 | Liang et al. |
| 2007/0255435 A1 | 11/2007 | Cohen et al. |
| 2009/0117945 A1* | 5/2009 | Mahler et al. .............. 455/569.1 |
| 2009/0204410 A1 | 8/2009 | Mozer et al. |

FOREIGN PATENT DOCUMENTS

| | | |
|---|---|---|
| EP | 0788268 A1 | 8/1997 |
| WO | 0124576 A1 | 4/2001 |
| WO | 0154458 A2 | 7/2001 |
| WO | 0217836 | 3/2002 |
| WO | 03026349 A1 | 3/2003 |
| WO | 2004012477 A2 | 2/2004 |
| WO | 20040110099 A2 | 12/2004 |
| WO | 2005036922 | 4/2005 |
| WO | 2005062766 A2 | 7/2005 |

\* cited by examiner

EARPIECE WITH VOICE MENU

BACKGROUND OF THE INVENTION

1. Field of the Invention

The present invention relates to personalized sound systems, including an ear-level device adapted to be worn on the ear, and the use of such systems to select functions to be carried out by companion devices such as mobile phones or other hand held devices.

2. Description of Related Art

Ear-level devices, including headphones, earphones, head sets, hearing aids and the like, are adapted to be worn at the ear of a user and provide personal sound processing. U.S. patent application Ser. No. 11/569,449, entitled Personal Sound System Including Multi-Mode Ear-level Module with Priority Logic, published as U.S. Patent Application Publication No. US-2007-0255435-A1 is incorporated by reference as if fully set forth herein. In US-2007-0255435-A1, a multi-mode ear-level device is described in which configuration of the ear-level device and call processing functions for a companion mobile phone are described in detail.

However, use of ear-level devices to provide user input for configuration of the devices, or to invoke functions that are executed by or supported by companion devices, are limited as a practical matter by their size and the manner in which they are worn by the user, For example, a user of an ear-level device with a mobile phone must often operate the mobile phone to invoke call functions such as redial, call-back or favorite dialing. Also, when changing the mode of operation at the ear-level device for a multi-mode device, the user input at the ear-level device can depend on difficult to recall button sequences and the like.

It is desirable to provide an ear-level device that can be more effectively utilized with companion modules given limited user input options on such devices.

SUMMARY OF THE INVENTION

An ear-level device which can be operable in multiple modes supports a voice menu by which more complex functions executable by the ear-level device or by a companion module can be selected using input at the ear-level device. Using the technology described herein, by pushing a button on an earpiece for example, a voice menu is activated announcing a set of functions such as voice dial, last number redial and so on. When the function that the user wants is announced, the user presses the same button on the earpiece, which activates the execution of the function.

A method for operating an ear-level device is described, where the ear-level device includes an audio transducer, a user input, a radio and control circuitry which transmits and receives communication signals encoding audio data using the radio to and from a companion module like a mobile phone. The method includes storing an ordered list of functions executable using the ear-level device or the companion module. In response to a signal from a user input at the ear-level device, logic at the ear-level device executes a sequence including playing an audible identifier of a function selected from the ordered list on the ear-level device, and determining whether a second signal from the user input at the ear-level device is received within a waiting interval. If the second user input is received within the waiting interval, a signal is generated indicating selection of the selected function. If the second user input is not received within the waiting interval, then the sequence repeats the playing and the determining for another function in the ordered list, until all the functions in the list have been traversed.

The ordered list of functions can include functions executable by the companion module for configuration or operation of the companion module, as well as functions executable by the ear-level device for configuration or operation of the ear-level device.

Configuration data for the voice menu can be produced using the companion module. For example, a rich user interface such as available on mobile phones having touch screens can be operated for configuration of the voice menu. For example, the user interface at the companion module can be used to enable users to select functions from a larger list of functions, and to specify the order of the selected functions to be played in the voice menu.

In various examples, the voice menu can include an audio introduction which acts as an announcement and/or provides instructions, and which is played at the ear-level device before executing the voice menu sequence. In some examples, functions which can be invoked using the voice menu may cause the invocation of a second level voice menu related to the function chosen at the first level.

Also, in some examples, functions which can be invoked using the voice menu may have first and second states. The signal indicating selection of the function can toggle the state of the function. For example, in a function to turn on or turn off a feature, the state of the selected feature can be used to determine whether its selection during a current voice menu sequence is to turn off or turn on the feature.

A personal communication device as described herein which includes an ear-level device as described above is configured to execute the voice menu in cooperation with a companion module like a mobile phone. Also, a method for operating a companion module is described for the purposes of providing configuration data to the ear-level device for the voice menu.

Other aspects and advantages of the present invention can be seen on review of the drawings, the detailed description, and the claims which follow.

DETAILED DESCRIPTION

A detailed description of embodiments of the present invention is provided with reference to the FIGS. 1-8.

Figure 1:
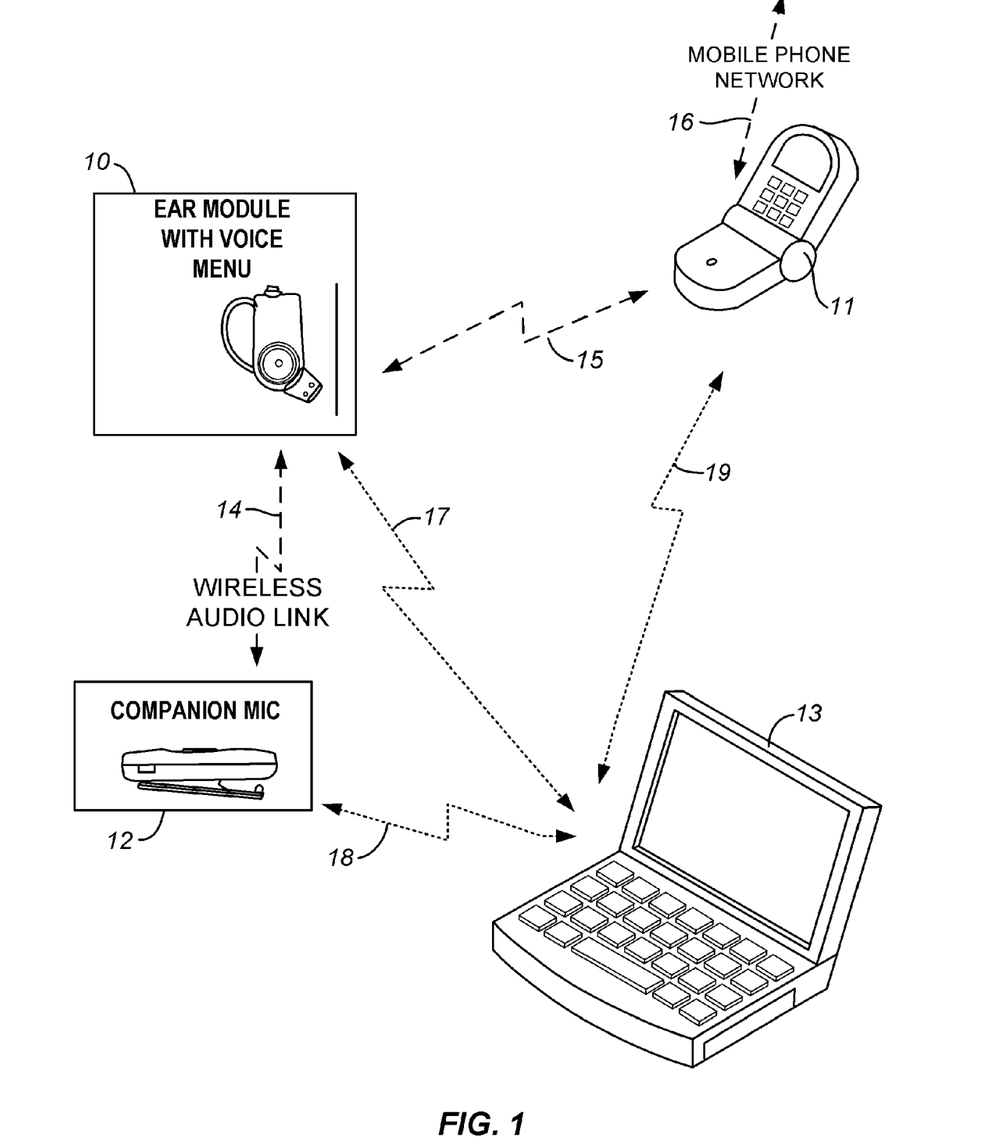
FIG. 1 is a simplified diagram of a wireless network including an ear-level device supporting a voice menu as described herein, along with companion modules which can communicate with the ear-level device.

FIG. 1 illustrates a wireless network including an ear module 10, adapted to be worn at ear-level, and a mobile phone 11. Also, included in the illustrated network are a companion computer 13, and a companion microphone 12. The ear module 10 can include a hearing aid or "environmental" mode having hearing aid functionality. The network facilitates techniques for providing personalized sound at the ear module 10 from a plurality of audio sources such as mobile phones 11, other audio sources such as televisions and radios, a companion computer, and the linked companion microphone 12.

The ear module 10 is adapted to operate in a plurality of modes, corresponding to modes of operating the ear module, such as a Bluetooth® mode earpiece for the phone 11, and the environmental mode. The ear module and the companion devices can execute a number of functions in support of utilization of the ear module in the network.

The ear module 10 includes a voice menu mode in which data indicating a function to be carried out by the ear module or by a companion device, such as a mobile phone 11, is selected in response to user input on the ear module 10. The user input can be for example the pressing of a button on the ear module 10.

In one embodiment described herein, the wireless audio links 14, 15 between the ear module 10 and the linked companion microphone 12, between the ear module 10 and the companion mobile phone 11 respectively, are implemented according to Bluetooth® compliant synchronous connection-oriented SCO channel protocol (See, for example, Specification of the Bluetooth System, Version 4.0, 17 Dec. 2009). Wireless link 16 couples the mobile phone 11 to a network service provider for the mobile phone service. The wireless configuration links 17, 18, 19 between the companion computer 13 and the ear module 10, the mobile phone 11, and the linked companion microphone 12, and optionally the other audio sources are implemented using a control channel, such as a modified version of the Bluetooth® compliant serial port profile SPP protocol or a combination of the control channel and SCO channels. (See, for example, BLUETOOTH SPECIFICATION, SERIAL PORT PROFILE, Version 1.1, Part K:5, 22 Feb. 2001).

Of course, a wide variety of other wireless communication technologies may be applied in alternative embodiments. The mobile phone 11 includes for example a display and a program that displays a user interface on the display such that the user can select functions of the mobile phone 11 such as call setup and other telephone tasks, which can then be selectively carried out via user input on the ear module 10, as described in more detail below. Alternatively, the user can select the functions of the mobile phone 11 via a keyboard or touch pad suitable for the entry of such information. The mobile phone 11 provides mobile phone functions including call setup, call answering and other basic telephone call management tasks in communication with a service provider on a wireless telephone network.

The companion microphone 12 consists of small components, such as a battery operated module designed to be worn on a lapel, that house "thin" data processing platforms, and therefore do not have the rich user interface needed to support configuration of private network communications to pair with the ear module 10. For example, thin platforms in this context do not include a keyboard or touch pad practically suitable for the entry of personal identification numbers or other authentication factors, network addresses, and so on. Thus, to establish a private connection pairing with the ear module, the radio is utilized in place of the user interface.

Figure 2:
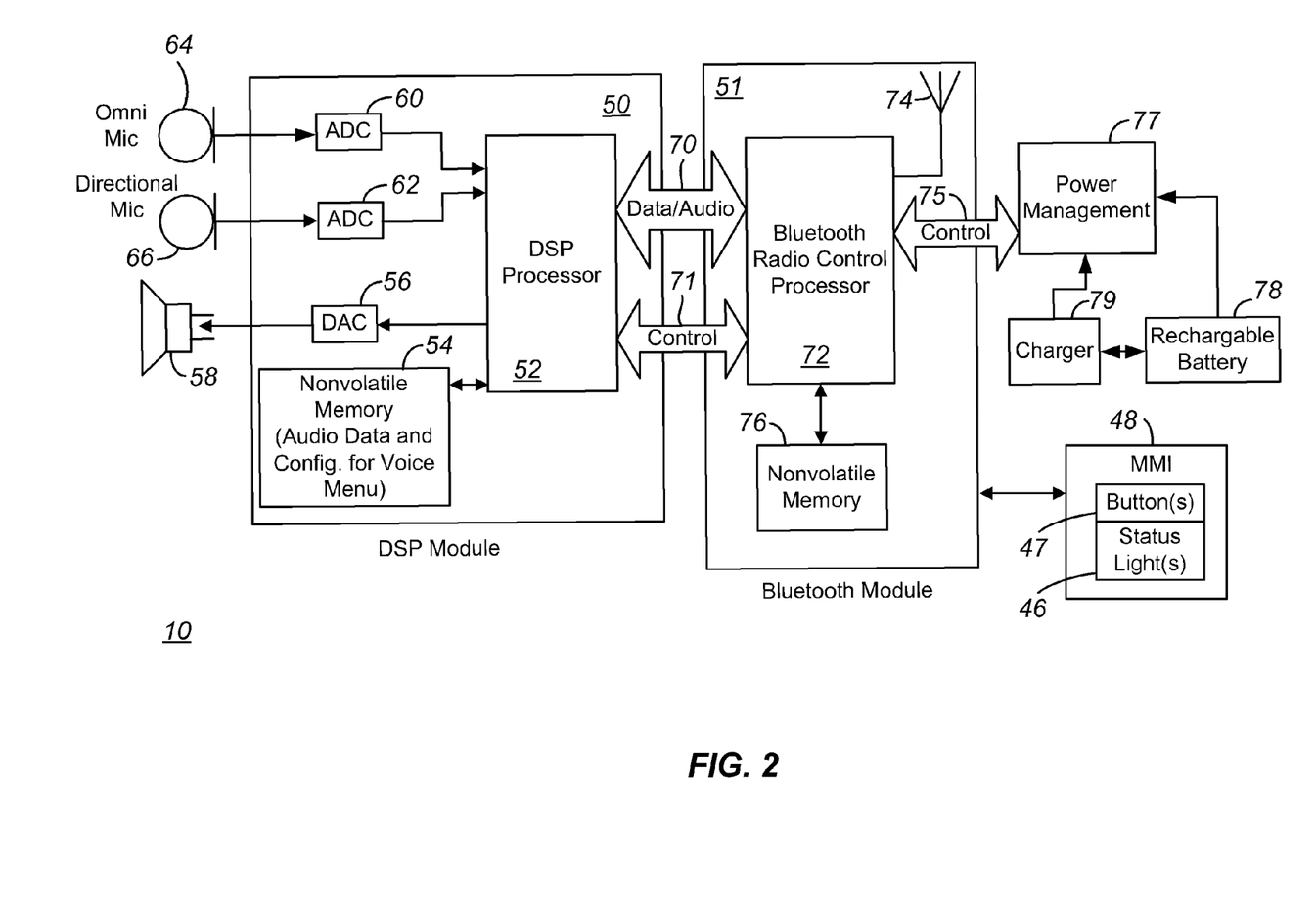
FIG. 2 is a simplified block diagram of circuitry in an ear-level device supporting a voice menu as described herein.

FIG. 2 is a system diagram for microelectronic and audio transducer components of a representative embodiment of the ear module 10. The system includes a data processing module 50 and a radio module 51. The data processing module includes a digital signal processor 52 (hence the reference to "DSP" in some of the Figures) coupled to nonvolatile memory 54. A digital-to-analog converter 56 converts digital output from the digital signal processor 52 into analog signals for supply to speaker 58 at the tip of the interior lobe of the ear module 10. A first analog-to-digital converter 60 and a second analog-to-digital converter 62 are coupled to the omnidirectional microphone 64 and a directional microphone 66, respectively, on the exterior lobe of the ear module. The analog-to-digital converters 60, 62 supply digital inputs to the digital signal processor 52.

The nonvolatile memory 54 stores audio data associated with various functions that can be carried out by the companion mobile phone. The nonvolatile memory 54 also stores computer programs and configuration data for controlling the ear module 10. These include providing a control program, a configuration file and audio data for the voice menu. The programs are executed by the digital signal processor 52 in response to user input on the ear module 10. The audio data is converted by the digital signal processor 52 into analog signals to supply a voice menu to speaker 58 as described below. In addition, the nonvolatile memory 54 stores a data structure for a set of variables used by the computer programs for audio processing, where each mode of operation of the ear module may have one or more separate subsets of the set of variables, referred to as "presets" herein.

The radio module 51 is coupled to the digital signal processor 52 by a data/audio bus 70 and a control bus 71. The radio module 51 includes, in this example, a Bluetooth® radio/baseband/control processor 72. The processor 72 is coupled to an antenna 74 and to nonvolatile memory 76. The nonvolatile memory 76 stores computer programs for operating the radio module 51 and control parameters as known in the art. The processing module 50 also controls the man-machine interface 48 for the ear module 10, including accepting input data from the one or more buttons 47 and providing output data to the one or more status lights 46.

The nonvolatile memory 76 is adapted to store parameters for establishing radio communication links with companion devices.

In the illustrated embodiment, the data/audio bus 70 transfers pulse code modulated audio signals between the radio module 51 and the processing module 50. The control bus 71 in the illustrated embodiment comprises a serial bus for connecting universal asynchronous receive/transmit UART ports on the radio module 51 and on a processing module 50 for passing control signals.

A power control bus 75 couples the radio module 51 and the processing module 50 to power management circuitry 77. The power management circuitry 77 provides power to the microelectronic components on the ear module in both the processing module 50 and the radio module 51 using a rechargeable battery 78. A battery charger 79 is coupled to the battery 78 and the power management circuitry 77 for recharging the rechargeable battery 78.

The microelectronics and transducers shown in FIG. 2 are adapted to fit within the ear module 10.

The ear module 10 operates in a plurality of modes, including in the illustrated example, an environmental mode for listening to conversation or ambient audio, a phone mode supporting a telephone call, and a companion microphone mode for playing audio picked up by the companion microphone which may be worn for example on the lapel of a friend. The signal flow in the device changes depending on which mode is currently in use. An environmental mode does not involve a wireless audio connection. The audio signals originate on the ear module 10 itself. The phone mode and companion microphone mode involve audio data transfer using the radio module 51. In the phone mode, audio data is both sent and received through a communication channel between the radio and the phone. In the companion microphone mode, the ear module receives a unidirectional audio data stream from the companion microphone.

The control circuitry in the device is adapted to change modes in response to commands exchanged by the radio, and in response to user input, according to priority logic. For example, the system can change from the hearing aid mode to the phone mode and back to the hearing aid mode, the system can change from the hearing aid mode to the companion microphone mode and back to the hearing aid mode. For example, if the system is operating in hearing aid mode, a command from the radio which initiates the companion microphone may be received by the system, signaling a change to the companion microphone mode. In this case, the system loads audio processing variables (including preset parameters and configuration indicators) that are associated with the companion microphone mode. Then, the pulse code modulated data from the radio is received in the processor and up-sampled for use by the audio processing system and delivery of audio to the user. At this point, the system is operating in a companion microphone mode. To change out of the companion microphone mode, the system may receive a hearing aid mode command via the serial interface from the radio. In this case, the processor loads audio processing variables associated with the hearing aid mode. At this point, the system is again operating in the hearing aid mode.

If the system is operating in the hearing aid mode and receives a phone mode command from the control bus via the radio, it loads audio processing variables associated with the phone mode. Then, the processor starts processing the pulse code modulated data with an up-sampling algorithm for delivery to the audio processing algorithms selected for the phone mode and providing audio to the microphone. The processor also starts processing microphone data with a down-sampling algorithm for delivery to the radio and transmission to the phone. At this point, the system is operating in the phone mode. When the system receives a hearing aid mode command, it then loads the hearing aid audio processing variables and returns to hearing aid mode.

The control circuitry also includes logic to change to the Function Selection and Control Mode in response to user input via the man-machine interface 48.

Figure 3:
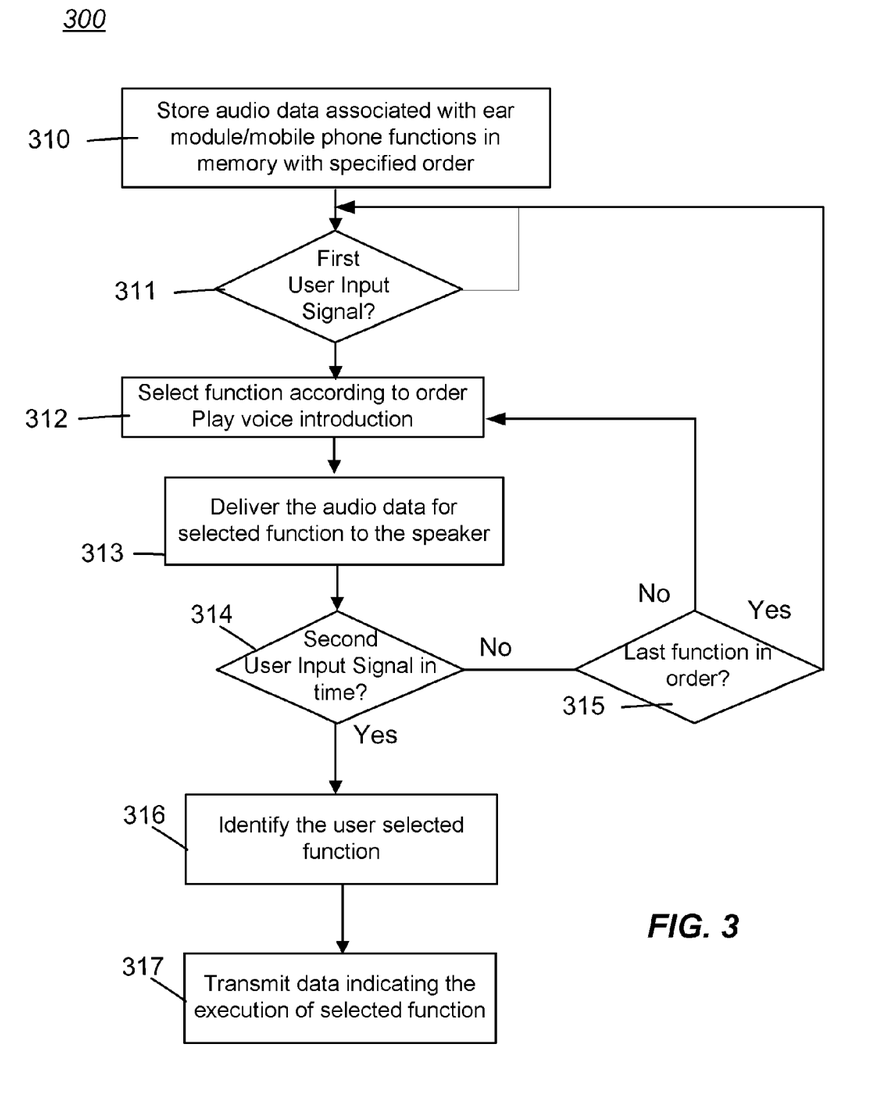
FIG. 3 is a flowchart for a voice menu process executed at an ear-level device.

FIG. 3 illustrates a flow diagram of an embodiment of the Voice Menu process 300, which can be executed by the processing module 50 in response to a first input signal from the man-machine-interface 48. The process 300 includes storing audio data associated with a list of ear module/companion device (i.e. mobile phone) functions in the menu in a specified order (310). The process is set to wait for a first input signal from the user input (311), such as the pressing of a button 47 on the ear module 10 by the user. In this example, upon the pressing of the button 47 by the user, input data is provided to the processing module 50 to initiate the voice menu process. The voice menu process begins by selecting a function from the list (312). Optionally, the voice menu plays an audio introduction alerting the user of activation of the voice menu, and optionally providing basic instructions. Then, the process delivers the audio data for that selected function to the speaker, where the person wearing the ear module can hear an identifier of the function (313). After playing the audio data, the voice menu process waits a time interval within which the user can provide a second user input (314). Preferably, the first and second input signals can be generated by the same button on the ear module. If the second user input does not arrive within the time interval, then the process determines whether the last function has been played in the voice menu (315). If the last voice has not been played, then the process selects the next function in order (returning to step 311). If the second user input is provided in time at step 314, then the user selected function is identified (316), and a signal is transmitted to the process that will execute the function, indicating that the function is to be executed (317).

As described below, the functions, as well as their order in the sequence, can be selected by the user from a large number of functions using for example a program on the mobile phone. In some alternative embodiments the functions and sequence can be selected by the user using a program on the companion computer 13. In other embodiments, the selection program is stored in memory on the ear module 10, and is activated for example by a button push on the ear module which is dedicated to that activity. In yet other embodiments, the selection program is stored and executed on a dedicated device.

In some embodiments, the selection program includes logic for tracking the usage of some or all of the functions, and using the tracking information to rearrange the functions in the sequence from time to time, based the tracked usage statistics. For example, the selection program may rearrange the functions in the sequence from time to time, so that the functions are in order beginning with the most frequently used function.

In some alternative embodiments, if the second user input signal is not received following delivery of the audio data associated with the second to last function in the sequence, the process 300 selects the last function is the sequence.

In embodiments, the functions in the sequence may further be arranged in a multi-level hierarchy which includes sub-menus or sub-functions, which the process 300 walks through in response to user input signals until the selected function is reached.

The functions to be carried out by the mobile phone can include call setup, as well as other telephone tasks. These functions may also be toggled on and off by the process 300. For example, the first time the function is selected it is toggled on, and the next time the function is selected it is toggled off.

As described above, in addition to the configuration and control of the mobile phone (or other companion modules), the Voice Menu process 300 can also be used for the configuration and control of the ear module 10. In such a case, upon selection of a function in the sequence for the ear module 10 at 314, the processing module 50 identifies the function for the ear module 10, and loads audio processing variables (including preset parameters and configuration indicators) that are associated with the function to be carried out.

Examples of the various selectable functions which may be carried out by the mobile phone or the ear module 10 include:

Last Number Redial.

Handset Voice Dial.

Battery Status.

Environmental Mode OFF/ON.
Environmental Mode Omi/Zoom.
Pair.
Voice Mail.
Favorite Number.
Favorite Number 2.
*8
Voice Dial.
Introduction.
None.

Figure 4:
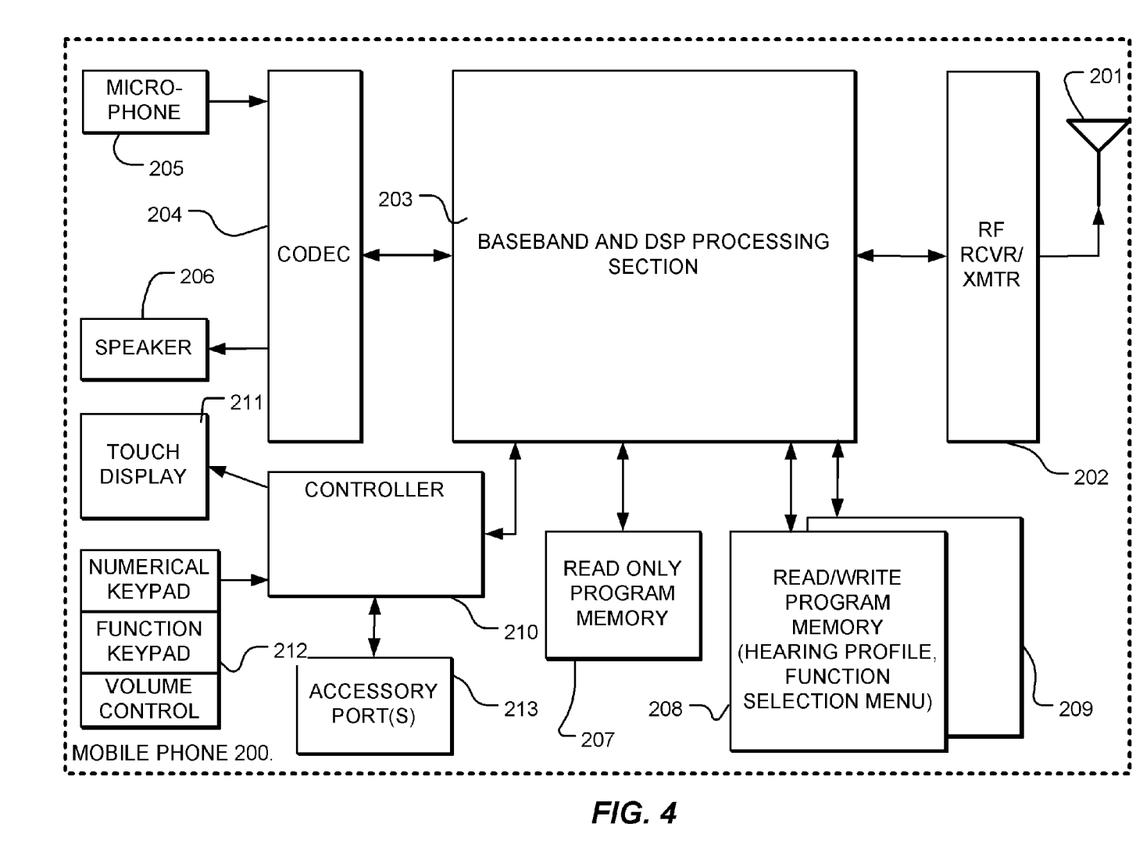
FIG. 4 is a simplified block diagram of circuitry in a mobile phone, operable as a companion module for an ear-level device and supporting a voice menu as described herein.

FIG. 4 is a simplified diagram of a mobile phone 200, representative of personal communication devices which provide resources for the user to select various mobile phone and ear module functions for the Function Selection and Control Mode process 300, as well as their order in the sequence. As described above, these mobile phone functions can include call setup, call answering and other basic telephone call management tasks in communication with a service provider on a wireless telephone network. The mobile phone 200 includes an antenna 201 and a radio including a radio frequency RF receiver/transmitter 202, by which the phone 200 is coupled to a wireless communication medium, according to one or more of a variety of protocols. In examples described herein, the RF receiver/transmitter 202 can include one or more radios to support multiprotocol/multiband communications for communication with the wireless service provider of the mobile phone network, as well as the establishment of wireless local radio links using a protocol like Bluetooth®. The receiver/transmitter 202 is coupled to baseband and digital signal processor DSP processing section 203, in which the audio signals are processed and call signals are managed. A codec 204, including analog-to-digital and digital-to-analog converters, is coupled to the processing section 203. A microphone 205 and a speaker 206 are coupled to the codec 204.

Read-only program memory 207 stores instructions, parameters and other data for execution by the processing section 203. In addition, a read/write memory 208 in the mobile phone stores instructions, parameters and other data for use by the processing section 203. There may be multiple types of read/write memory on the phone 200, such as non-volatile read/write memory 208 (flash memory or EEPROM for example) and volatile read/write memory 209 (DRAM or SRAM for example), as shown in FIG. 4. Other embodiments include removable memory modules in which instructions, parameters and other data for use by the processing section 203 are stored.

An input/output controller 210 is coupled to a touch sensitive display 211, to user input devices 212, such as a numerical keypad, a function keypad, and a volume control switch, and to an accessory port (or ports) 213. The accessory port or ports 213 are used for other types of input/output devices, such as binaural and monaural headphones, connections to processing devices such as PDAs, or personal computers, alternative communication channels such as an infrared port or Universal Serial Bus USB port, a portable storage device port, and other things. The controller 210 is coupled to the processing section 203. User input concerning call set up and call management, and concerning use of the hearing profile, user preference and environmental noise factors is received via the input devices 212 and optionally via accessories. User interaction is enhanced, and the user is prompted to interact, using the display 211 and optionally other accessories. Input may also be received via the microphone 205 supported by voice recognition programs, and user interaction and prompting may utilize the speaker 206 for various purposes.

In the illustrated embodiment, memory 208 stores a program for displaying a function selection menu user interface on the display 211, such that the user can select the functions to be carried out during the Voice Menu process 300 described above.

Figure 5:
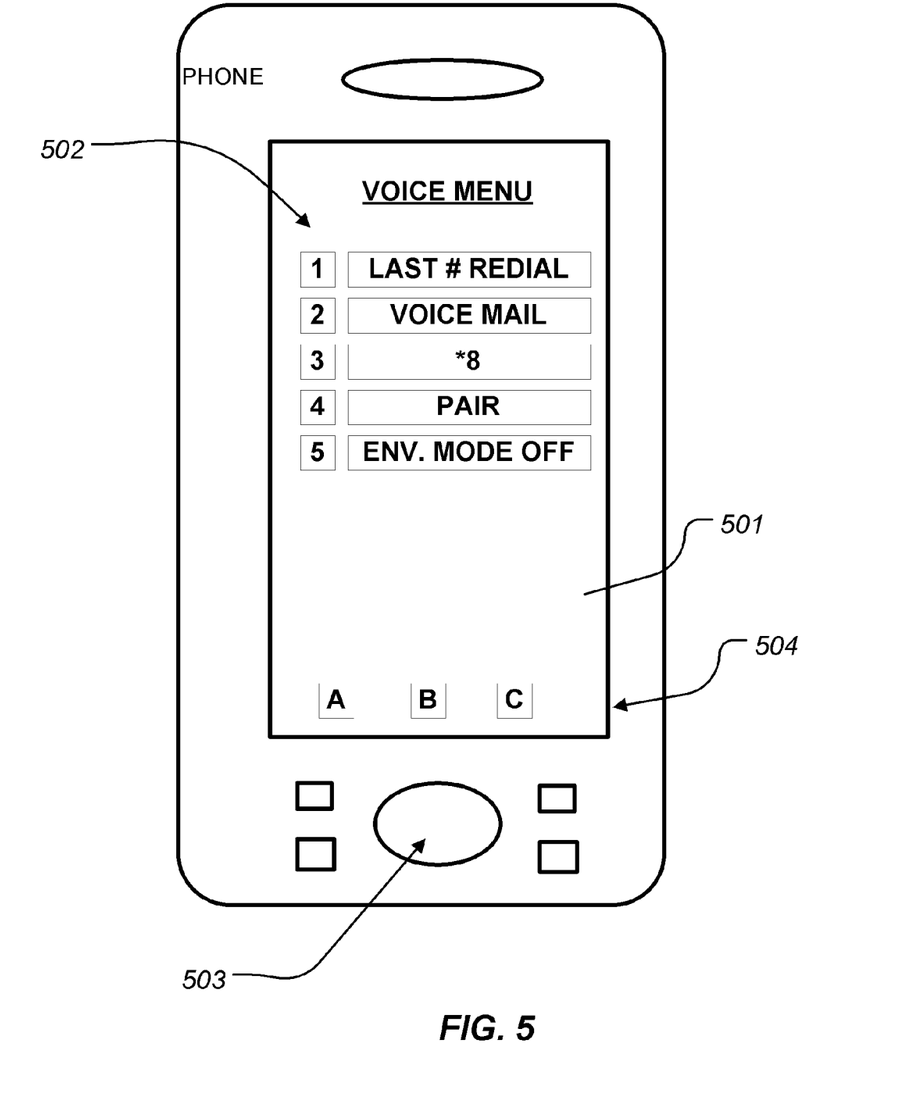
FIG. 5 illustrates a graphical user interface which can be executed on a companion module like a mobile phone for configuring a voice menu as described herein.

FIG. 5 shows a mobile phone including a graphic display 501. The graphic display 501 is rendered by a graphical user interface program, and includes a task bar 504, an information button 503, and a function selection menu 502 displayed on display 501. The task bar 504 displays icons for main app functions "A", "B", "C", on the mobile phone which may or may not relate to the voice menu.

The function selection menu 502 includes slots indicating the sequence of the functions carried out during the Voice Menu process 300. In the illustrated example, the function selection menu 502 has five slots. Alternatively, the number of slots may be different from five.

Figure 6:
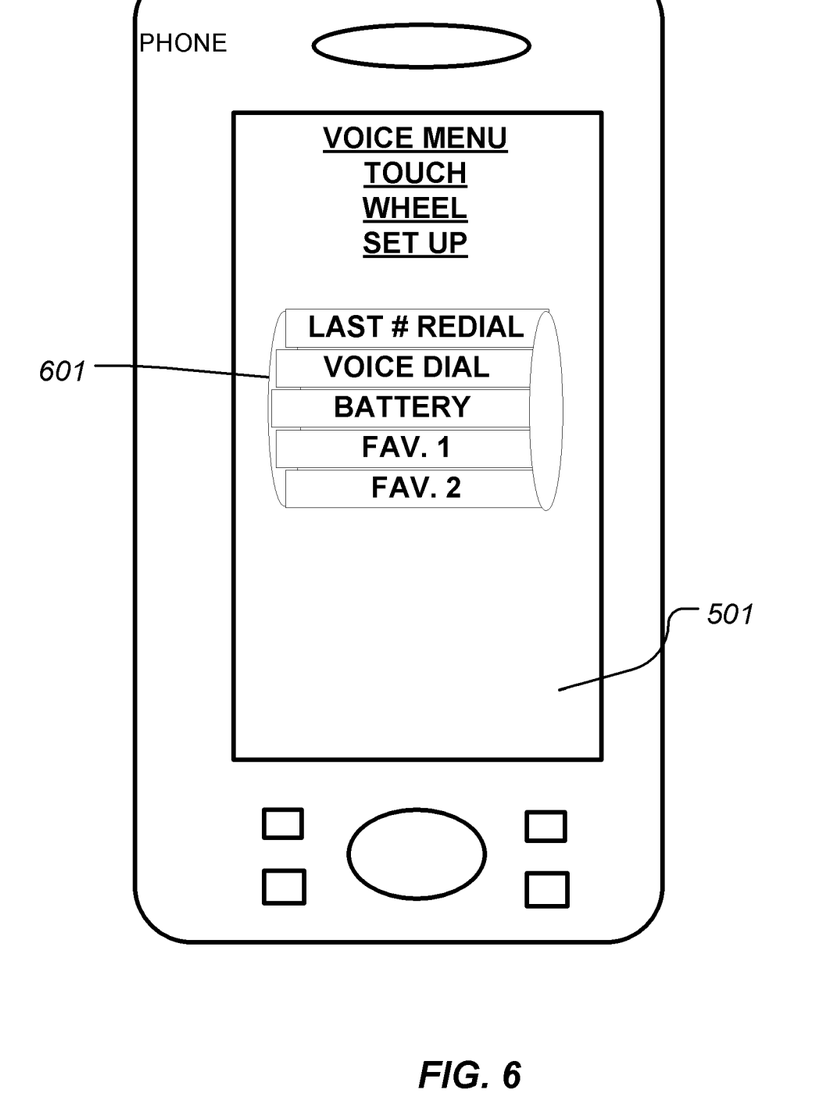
FIG. 6 illustrates a graphical user interface which can be executed on a companion module like a mobile phone and used for changing the configuration data for a voice menu as described herein.

The phone can also include a Voice Menu configuration process. FIG. 6 illustrates a touch dial selector widget on the graphic display 501, which a user can operate to select a function for a given slot in the list shown in FIG. 5. For example, the touch dial selector can be launched in response to a user touch on the "number" for a position in the list on the screen shown in FIG. 5. As shown in the graphic display 601 in FIG. 6, the functions are assigned to each of the slots from a large number of available functions using the touch dial selector in the illustrated example. The mobile phone or other companion module sends the configuration data to the ear-level device. Therefore, a method for operating an ear-level device including an audio transducer, a user input, a radio and control circuitry, which transmits and receives communication signals encoding audio data using the radio to and from a companion module, comprises storing configuration data for an ordered list of functions in the companion module used to configure a voice menu at the ear-level device, the functions being executable using the ear-level device or the companion module; using a program executed at the companion module to modify the configuration data; and sending the configuration data indicating configuration of the ordered list to the ear-level device from the companion module.

Figure 7:
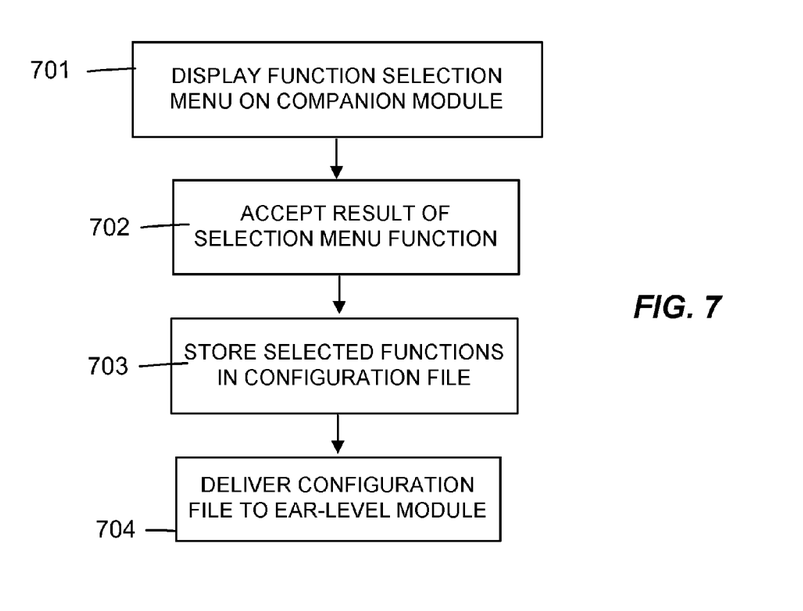
FIG. 7 is a simplified flowchart for changing configuration of a voice menu using a function selection menu on a companion module.

FIG. 7 shows a flow chart for a process executed on a companion module such as a mobile phone, for configuring the Voice Menu. The process includes displaying a function selection menu on the companion module, such as the touch wheel shown in FIG. 6 (701). Then the process accepts input from the user via the graphical user interface, such as touch sequences on the display, to select a function from the available choices, and assigns a position in the list for the function (702). Then the selected function and its position in the list are stored in a configuration file (703). The configuration file is then sent to the ear module (704).

Figure 8:
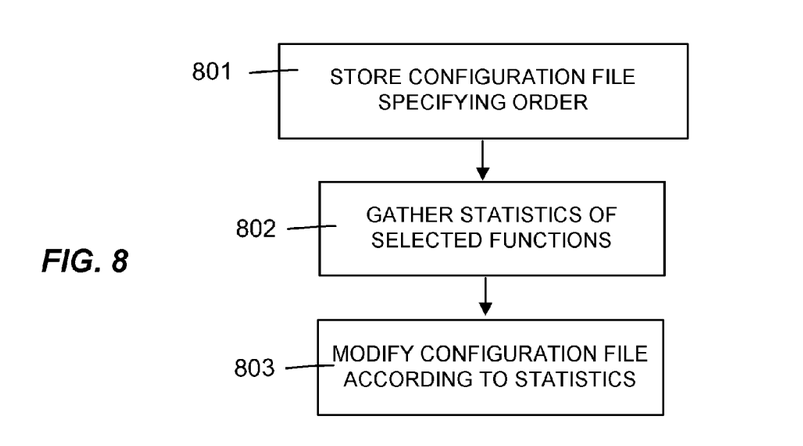
FIG. 8 is a simplified flowchart for changing configuration of a voice menu based on historical statistics relating to use of the voice menu.

FIG. 8 illustrates another process for configuring the Voice Menu based on statistics of utilization of the functions on the menu. The process includes storing a configuration file on the ear module or elsewhere and specifying the functions and their order on the voice menu (801). The process gathers statistics about use of the functions on the menu (802). Then, from time to time, the configuration file is revised according to the statistics (803). If the statistics are gathered by a companion module, the revised configuration file is sent to the ear module.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for operating an ear-level device including an audio transducer, a user input, a radio and control circuitry which transmits and receives communication signals encoding audio data using the radio to and from a companion module; comprising:
   storing, on the ear-level device, an ordered list of functions, including functions executable using the ear-level device or the companion module;
   in response to a signal from a push button user input at the ear-level device, executing a sequence including:
      playing an audible identifier of a function selected from the ordered list on the ear-level device, wherein a function selectable from the ordered list includes a function having first and second states; and
      determining on the ear-level device, whether a second signal from the push button user input at the ear-level device is received within a waiting interval, and if the second user input is received within the waiting interval, generating a signal indicating selection of the selected function, wherein the signal indicating selection of said function toggles the state of the function, and if the second signal from the push button user input is not received within the waiting interval, then automatically repeating the playing and the determining for another function in the ordered list.

2. The method of claim 1, wherein the ordered list of functions include functions executable by the companion module, and including sending the signal indicating selection of the selected function to the companion module.

3. The method of claim 1, wherein the companion module comprises a mobile phone.

4. The method of claim 1, wherein the companion module comprises a mobile phone, and the ordered list of functions includes one or more functions selected from a group including last number redial, favorite number dial, voice mail dial and voice dial.

5. The method of claim 1, wherein the ordered list of functions includes one or more functions selected from a group of configuration functions for the ear-level device.

6. The method of claim 1, including accepting configuration data specifying the functions in the ordered list and their order, by communication from the companion module.

7. The method of claim 1, including modifying configuration data specifying the functions in the ordered list and their order, in response to statistics related to use of the voice menu.

8. The method of claim 1, including playing an audio introduction at the ear-level device before executing the sequence.

9. The method of claim 1, wherein a function selectable from the ordered list includes execution of a second voice menu.

10. The method of claim 1, including after playing an audible identifier of a last function in the ordered list, generating a signal indicating selection of the last function independent of the second signal.

11. A method for operating an ear-level device including an audio transducer, a user input, a radio and control circuitry which transmits and receives communication signals encoding audio data using the radio to and from a companion module; comprising:
   storing, on the ear-level device, an ordered list of functions and audible identifiers linked to each function, the functions including functions executable using the ear-level device or the companion module;
   in response to a signal from a user input at the ear-level device, executing a sequence that traverses the ordered list, including:
      playing the audible identifier linked to a current function, starting with a first function in the ordered list, on the ear-level device; and
      determining on the ear-level device, whether a second signal from the user input at the ear-level device is received within a waiting interval, and if the second signal is received within the waiting interval, generating a signal indicating selection of the current function, and if the second user input is not received within the waiting interval, then automatically repeating the playing and the determining for a next function in the ordered list;
   wherein a particular function in the ordered list has first and second states, and wherein the signal indicating selection of said particular function toggles the state of the particular function; and including changing the audible identifier linked to the function in the ordered list from a first audible identifier of the function in the first state to a second audible identifier of the function in the second state to be played when subsequently executing said sequence that traverses the ordered list.

12. A personal communication device comprising:
   an ear-level device including a radio including a transmitter and a receiver which transmits and receives communication signals encoding audio data, an audio transducer; one or more microphones, a user input and control circuitry;
   wherein the control circuitry includes
      logic for communication using the radio with a companion module including a source of audio data;
      logic operable to execute a voice menu function and memory storing an ordered list of functions executable using the ear-level device or the companion module; the voice menu function including executing a sequence in response to a signal from a push button user input at the ear-level device, the sequence including:
         playing an audible identifier of a function selected from the ordered list on the ear-level device, wherein a function selectable from the ordered list includes a function having first and second states; and
         determining whether a second signal from the push button user input at the ear-level device is received within a waiting interval, and if the second signal from the push button user input is received within the waiting interval, generating a signal indicating selection of the selected function including logic to toggle the state of the function in response to the signal indicating selection of said function, and if the second signal from the push button user input is not received within the waiting interval, then automatically repeating the playing and the determining for another function in the ordered list.

13. The device of claim 12, wherein the ordered list of functions includes functions executable by the companion module, including logic to send the signal to the companion module.

14. The device of claim 12, wherein the companion module comprises a mobile phone.

15. The device of claim 12, wherein the companion module comprises a mobile phone, and the ordered list of functions includes one or more functions selected from a group including last number redial, favorite number dial, voice mail dial and voice dial.

16. The device of claim 12, wherein the ordered list of functions includes one or more functions selected from a group of configuration functions for the ear-level device.

17. The device of claim 12, including logic to accept configuration data specifying the functions in the ordered list and their order by communication from the companion module.

18. The device of claim 12, including logic to modify configuration data specifying the functions in the ordered list and their order in response to statistics related to use of the voice menu.

19. The device of claim 12, including logic to play an audio introduction at the ear-level device before executing the sequence.

20. The device of claim 12, wherein a function selectable from the ordered list includes execution of a second voice menu.

21. The device of claim 12, including logic which after playing an audible identifier of a last function in the ordered list, generates a signal indicating selection of the last function independent of the second signal.

22. A personal communication device comprising:
  an ear-level device including a radio including a transmitter and a receiver which transmits and receives communication signals encoding audio data, an audio transducer; one or more microphones, a user input and control circuitry;
  wherein the control circuitry includes
    logic for communication using the radio with a companion module including a source of audio data;
    logic operable to execute a voice menu function and memory storing an ordered list of functions executable using the ear-level device or the companion module; the voice menu function including executing a sequence that traverses the ordered list in response to a signal from a user input at the ear-level device, the sequence including:
      playing an audible identifier of a current function, beginning with a first function in the ordered list on the ear-level device; and
      determining whether a second signal from the user input at the ear-level device is received within a waiting interval, and if the second user input is received within the waiting interval, generating a signal indicating selection of the current function, and if the second signal is not received within the waiting interval, then automatically repeating the playing and the determining for a next function in the ordered list;
  wherein a particular function in the ordered list has first and second states first and second states, including logic to toggle the state of the particular function in response to the signal indicating selection of said particular function, to change the audible identifier linked to the function in the ordered list from a first audible identifier of the function in the first state to a second audible identifier of the function in the second state to be played when the logic subsequently executes said sequence that traverses the ordered list.

* * * * *